United States Patent [19]
Townsend

[11] Patent Number: 4,584,740
[45] Date of Patent: Apr. 29, 1986

[54] LINK SEPARATOR

[75] Inventor: Ray T. Townsend, Des Moines, Iowa

[73] Assignee: Townsend Engineering Company, Des Moines, Iowa

[21] Appl. No.: 641,275

[22] Filed: Aug. 16, 1984

[51] Int. Cl.$^4$ ............................................. A22B 0/00
[52] U.S. Cl. ....................................... 17/1 F; 83/371
[58] Field of Search .................... 17/1 R, 1 F, 33, 34, 17/52; 83/365, 371; 250/229, 231 SE

[56] References Cited

U.S. PATENT DOCUMENTS

| | | |
|---|---|---|
| 3,545,035 | 12/1970 | Piereder . |
| 3,646,637 | 3/1972 | Berendt . |
| 3,716,891 | 2/1973 | Demarest . |
| 3,808,636 | 5/1974 | Gouba . |
| 3,840,937 | 10/1974 | Berg . |
| 4,104,763 | 8/1978 | Tetsuro ................................. 17/1 F |
| 4,322,871 | 4/1982 | Townsend et al. . |
| 4,366,600 | 1/1983 | Townsend et al. . |
| 4,373,231 | 2/1983 | Mano .................................... 17/1 F |

FOREIGN PATENT DOCUMENTS 651983  8/1962  Canada ................................. 17/1 F Primary Examiner—John Sipos
Assistant Examiner—Steven P. Weihrouch
Attorney, Agent, or Firm—Zarley, McKee, Thomte, Voorhees & Sease

[57] ABSTRACT

A link cutter including a support frame and a series of conveyor assemblies for sequentially conveying links to the cutting zone of a knife assembly for severing the twisted casing section between adjacent links. A sensor is positioned upstream from the cutting zone and operates to actuate the knife assembly in response to sensing the twisted casing section. The sensor includes a plurality of roller members rotatably mounted upon a rotatable frame for the successive engagement of the links to the twisted casing sections. A light source on the sensor emits a beam of light which is sensed by a photocell when one of the roller member engages the twisted casing section thereby actuating the knife assembly for cutting the twisted casing section.

14 Claims, 10 Drawing Figures

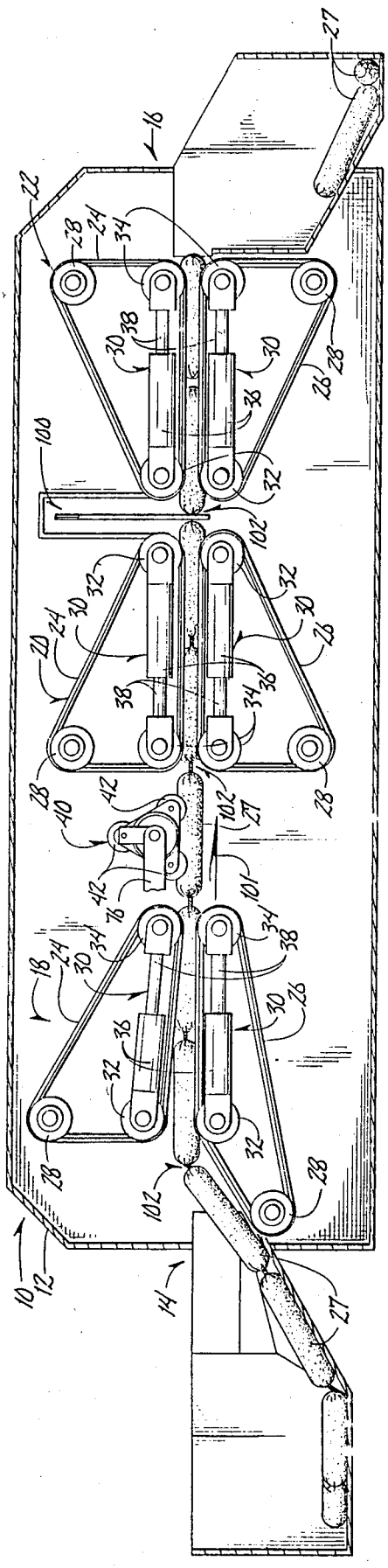

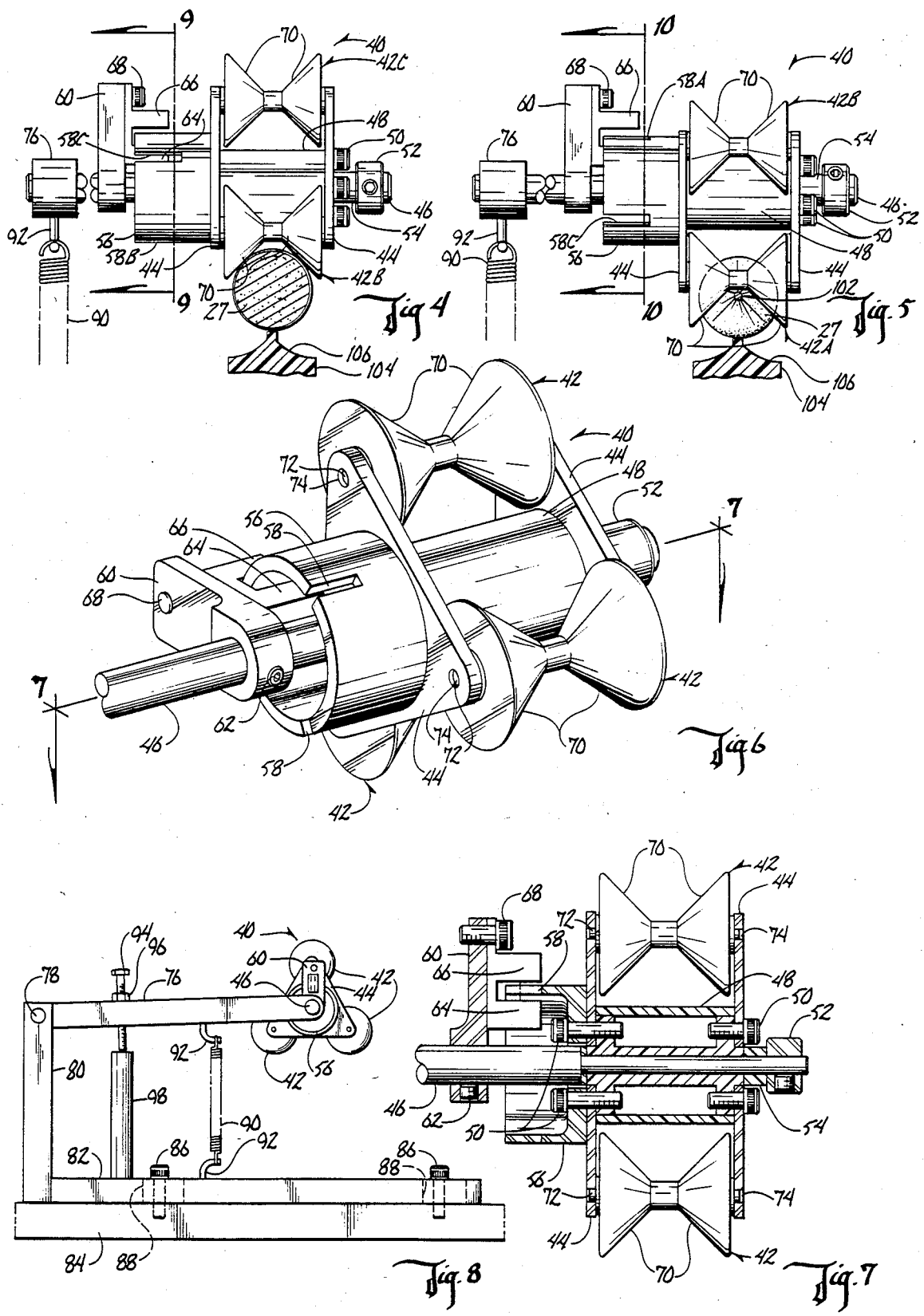

LINK SEPARATOR

BACKGROUND OF THE INVENTION

The present invention relates generally to an apparatus for separating a plurality of links interconnected by a twisted casing section and more particularly to a cutter apparatus adapted to separate interconnected sausage links into links of one or more sausages.

The output of most sausage making machines is a substantially continuous chain of sausage links interconnected by twisted casing sections. For shipping and/or packaging purposes, it is desirable that such chains of sausages be divided into cut links of a given number of sausages. Furthermore, it is desirable to be able to vary the number of sausages per cut link. Accordingly, there is a need for a machine for severing continuous chains of sausage links into segments comprising one or more links.

It is important that the twisted casing sections between links be accurately sensed and that the timing between the sensing device and cutting knife be accurately set so that only the twisted casing sections between links are severed. If the link itself is severed, the commercial value of any given link is substantially destroyed. Some prior link cutting machines, such as applicant's U.S. Pat. Nos. 4,366,600 and 4,322,871, have employed stationary sensors which utilize electromagnetic wave propagation and reception for detecting the junction links. However, irregularities in the shapes of the links may cause such "electric eye" sensors to actuate at the improper time or fail to actuate at the proper time. Other link cutting machines employ mechanical feeler arms which engage the link and follow the contour thereof. These mechanical sensors can also be accidentally tripped by irregular link shapes or may fail to be tripped if the twisted casing sections are irregular.

Accordingly, a primary objective of the present invention is the provision of an improved link cutter.

Another objective is to provide an improved link cutter including a sensor employing a mechanical feeler and electromagnetic wave propagation and reception for detecting the junction between links.

Another objective is to provide a link cutter wherein the sensor is adjustably positioned relatively to the cutting knife for varying the lead time for the knife response.

A further objective of the present invention is the provision of a link cutter wherein irregularities in the shapes of the links will not actuate the cutting knife.

These and other objectives will be apparent to those skilled in the art.

SUMMARY OF THE INVENTION

The link cutter of the present invention is adapted to operate continuously to sever a selected number of links from a generally continuous chain without any accidental destruction of individual links. A sensor which actuates the knife for cutting the twisted casing sections includes a plurality of rollers mounted upon a rotatable frame and a photocell positioned adjacent the frame for sensing a beam of light from a light source when the frame is rotated in response to the rollers engaging the twisted casing sections. The sensor is adjustably mounted relative to the knife to vary the lead time for knife response and a counter device is provided such that the knife is actuated only after the sensor has sensed a selected number of twisted casing sections.

BRIEF DESCRIPTION OF THE DRAWINGS

FIG. 1 is a side elevational view of the link cutting machine of the present invention.

FIG. 2 is a side elevational view showing the sensor in a nonactuating position.

FIG. 3 is a view similar to FIG. 2 showing the sensor in a knife actuating position.

FIG. 4 is a front elevational view taken along line 4—4 of FIG. 2.

FIG. 5 is a view taken along line 5—5 of FIG. 3.

FIG. 6 is a perspective view of the sensor of the present invention.

FIG. 7 is a view taken along line 7—7 of FIG. 6.

FIG. 8 is a side elevational view showing the bracket assembly which supports the sensor.

FIG. 9 is a view taken along line 9—9 of FIG. 4.

FIG. 10 is a view taken along line 10—10 of FIG. 5.

DESCRIPTION OF THE PREFERRED EMBODIMENT

The link cutter 10 of the present invention is shown in FIG. 1 and includes a housing 12 having an inlet end 14 and an outlet end 16.

The conveyor assembly and knife assembly of the present invention is generally similar to that described in applicant's U.S. Pat. No. 4,366,600. More particularly, link cutter 10 includes first and second feed conveyors 18 and 20, respectively, and a product removal conveyor 22. Each of the conveyors includes a pair of continuous belts 24 and 26 adapted to engage opposite sides of links 27 being conveyed thereby. Each of the conveyors also includes a drive roller 28 interconnected to one another by conventional chain and sprocket means and driven by a drive motor (not shown). Each of the conveyors also includes an elongated idler roller support arm 30 having idle rollers 32 and 34 rotatably supported at opposite ends thereof. Belts 24 and 26 are trained about the respective rollers 28, 30 and 32.

The idler support arms 30 are mounted upon link cutter 10 for adjustment transversely of the path of links 27 between them so as to accommodate links of different diameters. Conventional threaded shafts are provided for such adjustments. Idler roller support arms 30 also automatically adjust to take up the slack in the respective belt in response to such transverse adjustment of the arms. To accommodate this slack adjustment, support arms 30 include first and second portions 36 and 38 telescopically slidably interconnected with a compression spring (not shown) compressed therein to urge the first and second portions apart.

Each of the rollers 28, 30 and 32 has a cupped shape such that the respective belt 24 or 26 trained thereabout is cupped whereby the parallel run between the pairs of belts defines a partially tubular sleeve. This arcuate shape of the belts provides a support for transversely centering links 27 therebetween and thereby accurately positioning the links for the link sensor described herein below.

The sensor for detecting the presence of a twisted casing section between a pair of links is generally designated by the reference numeral 40. Sensor 40 includes a plurality of roller members 42 rotatably mounted between a pair of polygonally shaped plates 44. Plates 44 are rotatably mounted upon a shaft 46 such that the axis of rotation passes through the center of the plates.

Plates 44 are spaced apart by a spacer 48 which also serves as a bearing for the rotation of plates 44 about shaft 46. Plates 44 are connected to spacer 48 by any convenient means, such as cap screws 50. An end cap 52 is provided to maintain plates 44 upon shaft 46. A spacer 54 spaces end cap 52 apart from caps screws 50.

Rigidly secured to one of plates 44 for rotation therewith is a collar 56 having a plurality of notches 58 therein. Notches 58 are positioned so as to be aligned with the midpoints of each side of plate 44. An arm 60 is secured to shaft 46 by a set screw 62 or the like and supports a photocell 64 and a light source 66. Photocell 64 and light source 66 are positioned opposite one another with collar 56 extending therebetween so as to normally block the path of the beam of light emitted by light source 66. The rotation of collar 56 permits the beam of light to pass through one of the notches 58 therein when such notch aligns with photocell 64 and light source 66. Any convenient means can be utilized to connect the photocell and light source assembly to arms 60, such as cap screw 68.

Roller members 42 of sensor 40 generally have an hourglass shape and include a pair of frusto-conical portions 70 interconnected at their smallest diameter ends. The opposite ends of roller members 42 each have a centrally positioned hub 72 extending therefrom. Hubs 72 are rotatably received within hole 74 in plates 44 such that rollers 42 are rotatable about their longitudinal axis.

Shaft 46 is attached to a first arm 76 which in turn is pivotally connected by a pin 78 to second arm 80. Second arm 80 is connected to a base 82 which is secured to a portion of the framework 84 of link cutter 10 by cap screws 86 or the like. Cap screws 86 extend through slots 88 in base 82 such that sensor 40 can be adjustably positioned for movement toward or away from the cutting zone of link cutter 10. A spring 90 is fastened at its opposite ends to hooks 92 connected to first arm 76 and base 82 so as to bias sensor 40 into engagement with links 27. A bolt 94 extending through a lock nut 96 and through first arm 76 engages a peg 98 secured to base 82 so as to limit the movement of sensor 40 against the bias of spring 90.

Link cutter 10 also includes a conventional knife assembly 100 for severing the twisted casing sections as between links 27. Knife assembly 100 is similar to that disclosed in applicant's U.S. Pat. No. 4,366,600 and is in operative electrical communication with photocell 64 such that knife assembly 100 is actuated to sever the links when photocell 64 senses the beam of light from light source 66, as more fully described hereinafter.

In operation, the conveyor drive motor is actuated so as to convey links 27 from inlet end 14, through conveyor assemblies 18, 20 and 22, and to outlet end 16, as indicated by directional arrows 101. As the links pass from first feed conveyor 18 to second feed conveyor 20, the links engage two of the roller members 42 of sensor 40 which rotate about their longitudinal axis in response to movement of the links therethrough. The cupped surface presented by the hourglass shape of rollers 42 assures proper alignment of the links as they pass through sensor 40. As the links move downstream, roller 42A engages twisted casing section 102 under the bias of spring 90. This movement of roller 42A is accompanied by the rotation of plates 44 about shaft 46, thereby causing notch 58A to move into alignment with photocell 64 and light source 66 such that the beam of light emitted from light source 66 passes through notch 58A and is sensed by photocell 64, thereby actuating knife assembly 100 to sever twisted casing section 102 at the appropriate time. A time delay device (not shown) is included in link cutter 10 such that as a particular twisted casing section is sensed by sensor 40, that section will move to the cutting zone prior to being severed. Link cutter 10 also includes a counter means (not shown) connected to sensor 40 such that knife assembly 100 is actuated only after sensor 40 has sensed a selected number of twisted casing sections.

The twisting of the casing section between adjacent links 27 naturally tends to pull the links towards one another. As roller 42A drops into engagement with twisted casing section 102 in response to bias of spring 90, the cupped surface of the roller spreads apart the links on either side of section 102 so as to stretch the twisted section. The stretching of the twisted casing section may be further enhanced by having conveyor assemblies 18, 20 and 22 rotated at progressively faster speeds, respectively. Such stretching of twisted section 102 facilitates severing of the section by knife assembly 100.

As links 27 move past sensor 40, roller 42A moves with twisted casing section 102 as plates 44 rotate about shaft 46. Rotation of plates 44 continues until roller 42C engages the next successive link along with roller 42A. The sequence repeats itself as the upstream roller successively engages each twisted casing section such that sensor 40 rotates to actuate knife assembly 100. Sensor 40 is adapted to function for various size links due to the pivotability of first arm 76 upon which sensor 40 is mounted.

Slots 88 in base 82 permit sensor 40 to be positioned closer or further away from knife assembly 10 such that the timing between sensing of the twisted casing section and actuation of the knife may be adjusted. Also, set screw 62 allows arm 62 supporting photocell 64 and light source 66 to be positioned closer or further away from a respective notch 58 in collar 56 such that the sensitivity of sensor 40 can be varied. In FIG. 9, photocell 64 and light source 66 are positioned equidistance between adjacent notches 58A and 58B such that any slight rotation of sensor 40 in response to irregularities in the shapes of the links will not be sufficient to align notch 58A with photocell 64 and light source 66. Thus, knife assembly 100 cannot be accidentally activated. However, greater sensitivity of sensor 40 can be achieved by setting arm 62 closer to one notch or another such that photocell 64 and light source 66 will be triggered by smaller rotational movement of plates 44.

A link support member 104 is positioned opposite sensor 40 so as to support the ends of the adjacent links on either side of twisted casing section 102. Support member 104 has recessed areas 106 so as not to interfere with roller 42 as it drops into engagement with twisted casing section 102.

Thus, there has been shown and described the link cutter which satisfies at least all of the stated objectives.

What is claimed is:

1. An apparatus for separating a plurality of links interconnected by twisted casing sections, comprising:
    a support frame including a cutting zone having opposite upstream and downstream sides,
    a conveyor means on said frame for sequentially conveying links to and through said cutting zone,
    a knife movably supported in said cutting zone for severing the stretched twisted casing section,
    a knife drive means, a sensor positioned on the upstream side of said cutting zone for detecting the presence of a twisted casing section between a pair of links, said sensor being operatively connected to said knife drive means for cutting movement of the knife through the sensed twisted casing section upon movement of said twisted casing section downstream from said sensor to said cutting zone, said sensor comprising a rotatable sensor frame, a plurality of members rotatably mounted upon said sensor frame at a common radius from the axis of rotation, said members successively engage said links and said twisted casing sections thereby rotating said sensor frame, a light source mounted adjacent said sensor frame operative to direct a beam of light into the path of said sensor frame and a photocell positioned for sensing said beam of light when said sensor frame is rotated, said knife drive means being actuated in response to sensing of said beam of light by said photocell, a collar having a plurality of openings therein is secured to said sensor frame for rotation therewith about said axis of rotation, said light source and said photocell being mounted adjacent said collar at least one of said light source of said photocell being located inside of said collar such that said collar normally blocks said beam of light from being sensed by said photocell, said openings aligning with said light source and said photocell when said sensor frame rotates whereby said photocell senses said beam of light.

2. The apparatus of claim 1 wherein said sensor is adjustably connected to said support frame for movement toward and away from said cutting zone, thereby to vary the lead time for actuating said knife drive means.

3. The apparatus of claim 1 wherein said sensor further includes means for biasing said members whereby said members successively engage said twisted casing sections.

4. The apparatus of claim 1 wherein said members have a cupped surface for engagement with said links.

5. The apparatus of claim 4 wherein said cupped surface of said members spreads adjacent links apart when said member engages the twisted casing section therebetween.

6. The apparatus of claim 1 further comprising a counter means connected to said sensing means and knife drive means whereby said knife drive means is actuated only after said sensing means has sensed a selected number of twisted casing sections.

7. The apparatus of claim 1 further including means for adjustably positioning said light source and said photocell with respect to said sensor frame whereby the sensitivity of said sensor to irregularities in link shape can be varied.

8. An apparatus for separating a plurality of links interconnected by twisted casing sections, comprising:
a support frame including a cutting zone having opposite upstream and downstream sides,
a conveyor means on said frame for sequentially conveying links to and through said cutting zone,
a knife movably supported in said cutting zone for severing the stretched twisted casing section,
a knife drive means,
a sensor positioned on the upstream side of said cutting zone for detecting the presence of a twisted casing section between a pair of links,
said sensor being operatively connected to said knife drive means for cutting movement of the knife through the sensed twisted casing section upon movement of said twisted casing section downstream from said sensor to said cutting zone,
said sensor comprising a rotatable sensor frame, a plurality of members rotatably mounted upon said sensor frame at a common radius from the axis of rotation, said members successively engage said links and said twisted casing sections thereby rotating said sensor frame,
a collar having a plurality of openings therein is secured to said sensor frame for rotation therewith about said axis of rotation, a light source and a photocell being mounted adjacent said collar at least one of said light source or said photocell being located inside of said collar such that said collar normally blocks said beam of light from being sensed by said photocell, said openings aligning with said light source and said photocell when said sensor frame rotates whereby said photocell senses said beam of light;
means connecting said sensor and said knife drive means to actuate said knife to move said knife through said twisted casing section downstream from said sensor when said sensor frame is rotated.

9. The apparatus of claim 8 wherein said sensor is adjustably connected to said support frame for movement toward and away from said cutting zone, thereby to vary the lead time for actuating said knife drive means.

10. The apparatus of claim 8 wherein said sensor further includes means for biasing said members whereby said members successively engage said twisted casing sections.

11. The apparatus of claim 8 wherein said members have a cupped surface for engagement with said links.

12. The apparatus of claim 11 wherein said cupped surface of said members spreads adjacent links apart when said member engages the twisted casing section therebetween.

13. The apparatus of claim 8 further comprising a counter means connected to said sensing means and knife drive means whereby said knife drive means is actuated only after said sensing means has sensed a selected number of twisted casing sections.

14. The apparatus of claim 8 wherein said electrical means includes a light source for emitting a beam of light into the path of said sensor and a photocell positioned for sensing said beam of light when said sensor is rotated.

* * * * *